United States Patent [19]
Taniai et al.

[11] Patent Number: 5,018,098
[45] Date of Patent: May 21, 1991

[54] DATA TRANSFER CONTROLLING APPARATUS FOR DIRECT MEMORY ACCESS

[75] Inventors: Takayoshi Taniai; Tadashi Saitoh; Atsushi Fujihira, all of Kawasaki, Japan

[73] Assignees: Fujitsu Limited, Kawasaki; Fujitsu Microcomputer Systems Limited, Kawashi, both of Japan

[21] Appl. No.: 186,847

[22] Filed: Apr. 27, 1988

[30] Foreign Application Priority Data

May 7, 1987 [JP] Japan ............................... 62-109753
May 12, 1987 [JP] Japan ............................... 62-113604

[51] Int. Cl.⁵ .......................... G06F 9/22; G06F 12/02
[52] U.S. Cl. ............................. 364/900; 364/942.3; 364/947.2; 364/947; 364/951.1; 364/951; 364/944.6; 364/944; 364/970.5; 364/962.4
[58] Field of Search ... 364/200 MS File, 900 MS File

[56] References Cited

U.S. PATENT DOCUMENTS

| | | | |
|---|---|---|---|
| 3,938,098 | 2/1976 | Garlic | 364/200 |
| 3,988,719 | 10/1976 | Whitby et al. | 340/172.5 |
| 4,156,279 | 5/1979 | Wilhite | 364/200 |
| 4,245,305 | 1/1981 | Gechele et al. | 364/200 |
| 4,811,306 | 3/1989 | Boning et al. | 364/200 |

FOREIGN PATENT DOCUMENTS

0169577 1/1986 European Pat. Off. .

*Primary Examiner*—Gareth D. Shaw
*Assistant Examiner*—Kevin A. Kriess

*Attorney, Agent, or Firm*—Armstrong, Nikaido, Marmelstein, Kubovcik & Murray

[57] ABSTRACT

A data transfer controlling apparatus for direct memory access comprising one or more first microaddress registers, each of which registers stores microaddress information for program processing of the data transfer for a corresponding channel; a second microaddress register which stores microaddress information for program processing other than the program processing of the data transfer; a micro read only memory operatively connected to said first and second microaddress registers, for storing microinstructions and outputting a predetermined microinstruction in accordance with microaddress information read out from a selected one of the first microaddress registers and the second microaddress register; and an incremental element operatively connected to said first and second microaddress registers, for incrementing the value of the microaddress information read out from the selected one of the first microaddress registers and the second microaddress register, and for writing the incremented microaddress information to the selected one of the first microaddress registers and the second microaddress register; the microaddress information stored in one of the first microaddress registers for the corresponding channel being read out when program processing of data transfer for the corresponding channel is carried out, the microaddress information stored in the second microaddress register being read out when program processing other than the program processing of data transfer is carried out.

8 Claims, 15 Drawing Sheets

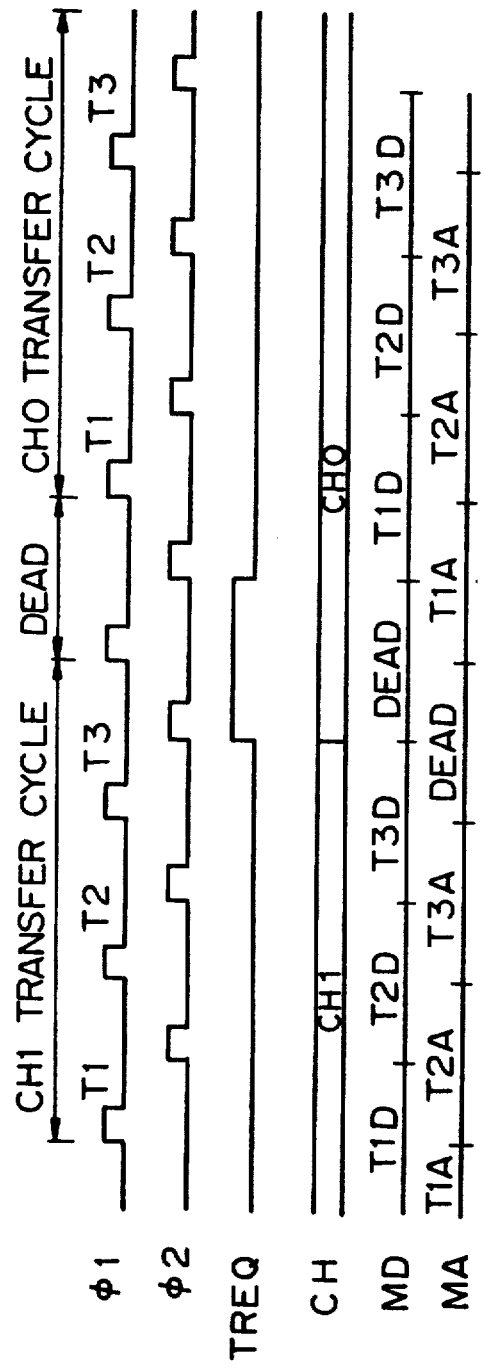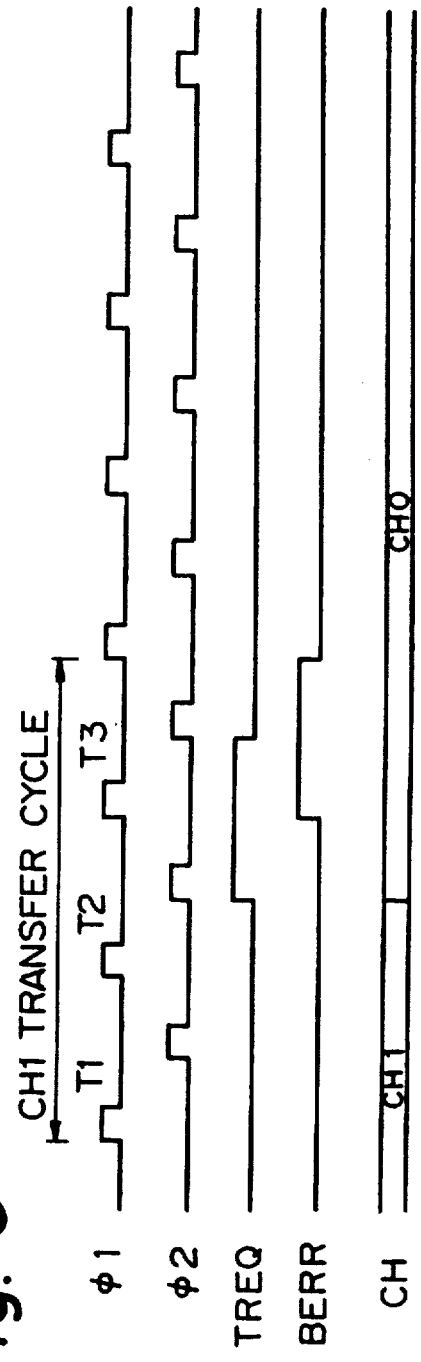

DATA TRANSFER CONTROLLING APPARATUS FOR DIRECT MEMORY ACCESS

BACKGROUND OF THE INVENTION

1. Field of the Invention

The present invention relates to a data transfer controlling apparatus for direct memory access (DMA), more particularly, to a DMA data transfer controlling apparatus which controls data transfer by a DMA controller controlling the data transfer without going through a CPU.

2. Description of the Related Art

In general, a DMA transfer controlling apparatus is comprised of a central processing unit (CPU), input-output unit (I/O unit), memories, and a DMA controller connected via address buses, data buses, and buses for control signals (for example, read/write signal buses) to form a microcomputer system. When DMA transfer is performed, the above-mentioned DMA controller takes over the above-mentioned buses from the CPU. In accordance with commands written in advance by the CPU into the DMA controller, the DMA controller controls the data transfer between the memories or between the memory and the I/O unit.

In this connection, it is conceived to apply microprogram control to the DMA controller. If the microprogram control is applied, the DMA controller may be comprised of a request handler, data handler, and microunit. Here, the microunit is a unit which, based on a data transfer request signal from the above-mentioned I/O unit, for example, sends out control signals for predetermined data transfer (that is, data transfer for a predetermined channel) to the data handler, etc. To carry out such an operation, the microunit is provided inside with a plurality of microaddress registers corresponding to the number of channels and a micro read only memory ($\mu$ROM) which successively outputs predetermined microinstructions in accordance with microaddress information successively read out from one of the microaddress registers. The successively read out microinstructions (by which microinstructions are comprised a microprogram) are supplied to the above-mentioned data handler, etc. as control signals for data transfer for a corresponding channel.

In this case, after the data transfer program processing (comprised of a plurality of transfer cycles) for one channel (here, the first channel) is completed, the microunit receives a transfer request signal for processing of the data transfer program for another channel (here, the second channel). That is, the transfer request signal for processing of the data transfer program is received by the microunit at the final cycle of the transfer program processing for the above-mentioned first channel (that is, after the correct execution of the data transfer processing for the first channel), whereby the channel by which data is to be transferred is switched.

However, in this case, there is a deviation of one cycle between the timing by which microaddress information is read out from a predetermined microaddress register and the timing for execution of a predetermined data transfer cycle by the microinstruction output from the $\mu$ROM in accordance with the read out microaddress information (that is, the timing of internal processing for transfer in the DMA controller is ahead of the timing of the external transfer cycle by one cycle). Therefore, when the transfer request signal is received at the above-mentioned timing, there is a dead cycle of one cycle length from the transfer cycle of the first channel (final transfer cycle before change of channels) until entering the transfer cycle of the second channel (first transfer cycle after change of channels), that is, for performing channel transition. As a result, if the microprogram control is simply applied to the DMA controller, there is the problem that this delays the operation of the apparatus.

To eliminate the above problem, it is conceived to send the above-mentioned transfer request signal to the microunit before the end of the processing of the transfer program of the first channel (that is, during the transfer cycle one cycle before the final transfer cycle) so as to prepare for the next transfer in advance in the microunit.

However, when the transfer request signal is received at this timing, if a bus error arises during the transfer with respect to the first channel and a bus error signal is sent in from the outside (the bus error signal being sent in at the final transfer cycle of the above-mentioned first channel), the channel for the next data transfer (that is, the above-mentioned second channel) will already be switched to by the receipt of the above-mentioned transfer request signal before that (in transfer cycle one cycle before final transfer cycle). As a result, there will be the mistaken judgment that the above-mentioned bus error has arisen in the data transfer of the above-mentioned second channel. Therefore, when a transfer program processing request is received at the above-mentioned timing, as mentioned above, despite the bus error having arisen in the data transfer of the first channel, there is the problem that the switching to the above-mentioned second channel before detection of this will lead to the erasure (destruction) of the microaddress information which is stored in the microaddress register of the second channel (that is, the microaddress information will be rewritten to the microaddress information for the bus error processing). Therefore, in the above DMA controller, it is impossible to output transfer program processing request signals in the transfer cycle before the final transfer cycle, as mentioned above.

Next, in the start processing of the above-mentioned transfer program, microaddress information may be read out as an initial value from a mapping program logic array (mapping PLA) provided in the microunit. Next, data of the $\mu$ROM (microinstruction) is read out based on the readout microaddress information. Based on the read out microinstruction, a predetermined data transfer program processing is started via the above-mentioned data handler.

In this way, in the above DMA controller, when start processing for the transfer program is requested, microaddress information is read out as an initial value from the above-mentioned mapping PLA and then input into the $\mu$ROM, so it took about two cycles from the input of the above-mentioned start processing request signal into the mapping PLA to the start of the above-mentioned data transfer processing. Thus, there is the problem that this reduced the speed of the above-mentioned start processing by a corresponding amount.

SUMMARY OF THE INVENTION

The present invention was made so as to solve the above-mentioned problems accompanying bus error processing and start processing and has as its first object the elimination of destruction of the contents of the microaddress register corresponding to a channel changed to, the elimination of a that great an increase in the physical amount, and the elimination of the above-mentioned dead cycle upon channel transition even if a data transfer channel is switched and then a bus error signal or the like regarding the data transfer of the pre-switched channel is sent in.

To achieve the first object, according to the present invention, there is provided a data transfer controlling apparatus for direct memory access comprising one or more first microaddress registers, each of which registers stores microaddress information for program processing of the data transfer for a corresponding channel; a second microaddress register which stores microaddress information for program processing other than the program processing of the data transfer; a micro read only memory operatively connected to said first and second microaddress registers, for storing microinstructions and outputting a predetermined microinstruction in accordance with microaddress information read out from a selected one of the first microaddress registers and the second microaddress register; and an incremental element operatively connected to said first and second microaddress registers, for incrementing the value of the microaddress information read out from the selected one of the first microaddress registers and the second microaddress register, and for writing the incremented microaddress information to the selected one of the first microaddress registers and the second microaddress register; the microaddress information stored in one of the first microaddress registers for the corresponding channel being read out when program processing of data transfer for the corresponding channel is carried out, the microaddress information stored in the second microaddress register being read out when program processing other than the program processing of data transfer is carried out.

According to the above construction, provision of the above-mentioned second microaddress register enables, when, for example, bus error processing or other exceptional program processing is performed, the microaddress information stored in the second microaddress register to be read out and, using the readout microaddress information, the microinstruction stored in the μROM to be read out. Therefore, when the above-mentioned bus error signal or the like is sent in, the content of the above-mentioned first microaddress register corresponding to the above-mentioned channel changed to is not destroyed, there is not that great an increase in the physical amount, and there is no dead cycle in the channel transition.

Further, the present invention has as a second object the use of the above-mentioned second microaddress register for high speed start processing of the data transfer without a dead cycle.

To achieve the second object, according to the present invention, there is provided a data transfer controlling apparatus further comprising the above mapping PLA, the microaddress information read out from the mapping PLA being written into the first microaddress registers during the program processing based on microaddress information read out from the second microaddress register.

According to the above construction, during the operation of the above-mentioned second microaddress register, the microaddress information read out as the initial value from the mapping PLA is written in advance into the first microaddress registers, whereby when a data transfer request is received, the μROM is immediately operated based on the prewritten microaddress information and thus high speed data transfer start processing without a dead cycle can be performed.

BRIEF DESCRIPTION OF THE DRAWINGS

FIG. 4 is a view showing an example of the operation timing of the apparatus of FIG. 3;

FIG. 5 is a view showing another example of the operation timing of the apparatus of FIG. 3;

DESCRIPTION OF THE PREFERRED EMBODIMENTS

To further clarify the technical background of the present invention, first an explanation will be given on a DMA data transfer controlling apparatus in the prior art.

Figure 1:
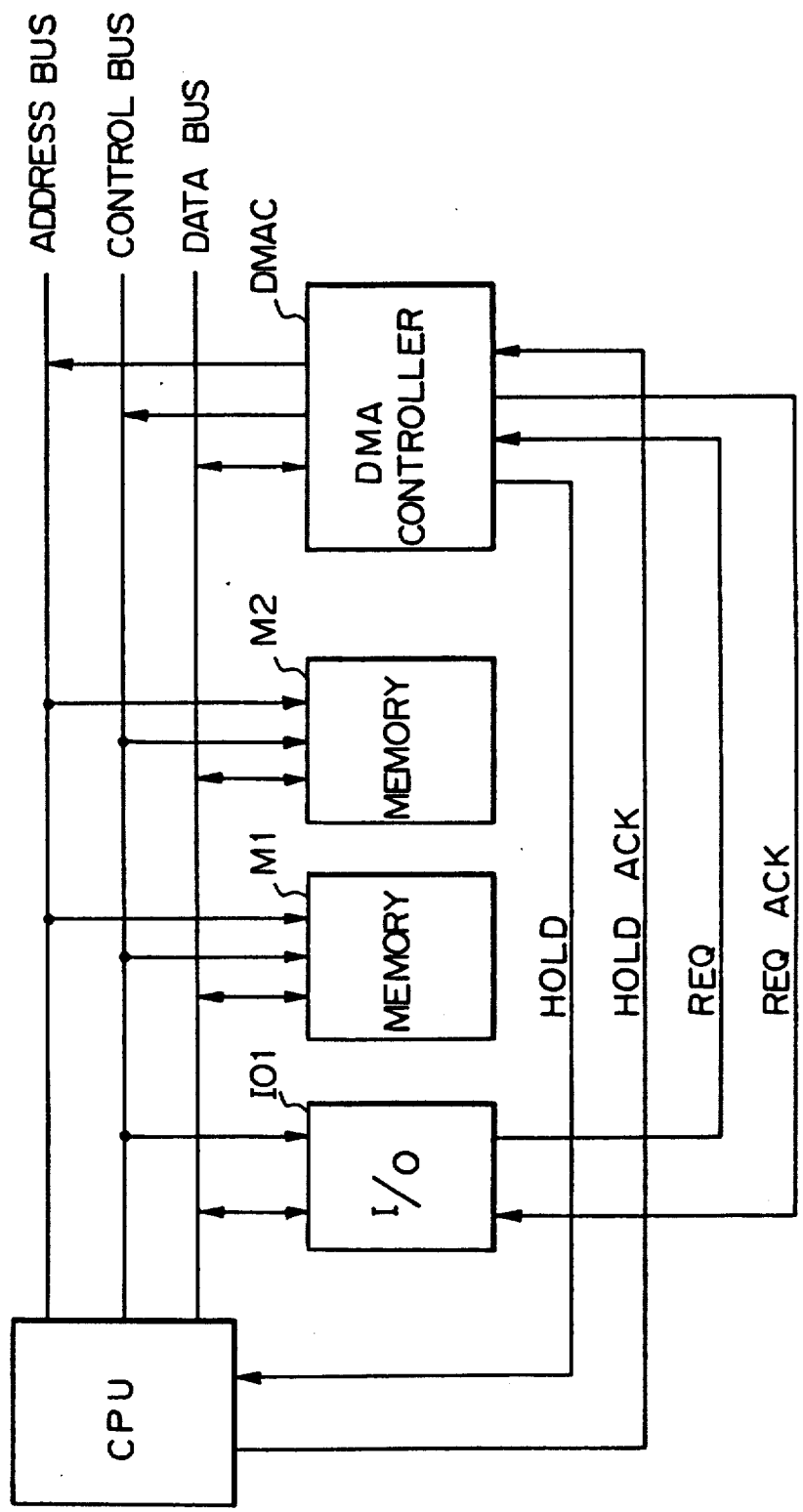
FIG. 1 is a view explaining the general concept of DMA data transfer in the prior art.

FIG. 1 is a view explaining the general concept of DMA data transfer, a CPU, I/O unit (for example, IO1), memories (for example, M1 and M2), DMA controller (DMAC), etc. are mutually connected by address buses, data buses, and buses for control signals (for example, read/write signal buses) to form a microcomputer system. When DMA transfer is performed, the above-mentioned DMA controller takes over the above-mentioned buses from the CPU. In accordance with commands written in advance by the CPU in the DMA controller, the DMA controller controls the data transfer between the memories (for example, between M1 and M2) or between the memory and the I/O unit (for example, from the IO1 to M1 or from M1 to the IO1). To carry out such an operation, the DMA controller sends out a hold request signal HOLD to the CPU, by which the operation of the CPU is temporarily suspended and the CPU hands over access to the buses. A hold acknowledge signal HOLD ACK is returned from the CPU to the DMA controller. Note that before the above-mentioned hold request signal is sent, predetermined commands are registered from the CPU in the DMA controller in advance, then the hold request signal is sent out based on the start instructions from the CPU. That is, for example, in the case of data transfer between memories, the addresses of the source and destination, the amount of transfer data (byte information), etc. are registered, and data transfer is performed between the memories through the DMA controller until the amount of transfer data becomes zero. Further, in the case of data transfer between the I/O unit and the memory, for example, a transfer request signal REQ is sent out from the predetermined I/O unit to the DMA controller, a transfer request acknowledge signal REQ ACK is returned from the DMA controller, the address of the destination is designated, and data transfer is performed from the I/O unit to the predetermined memory.

Figure 2:
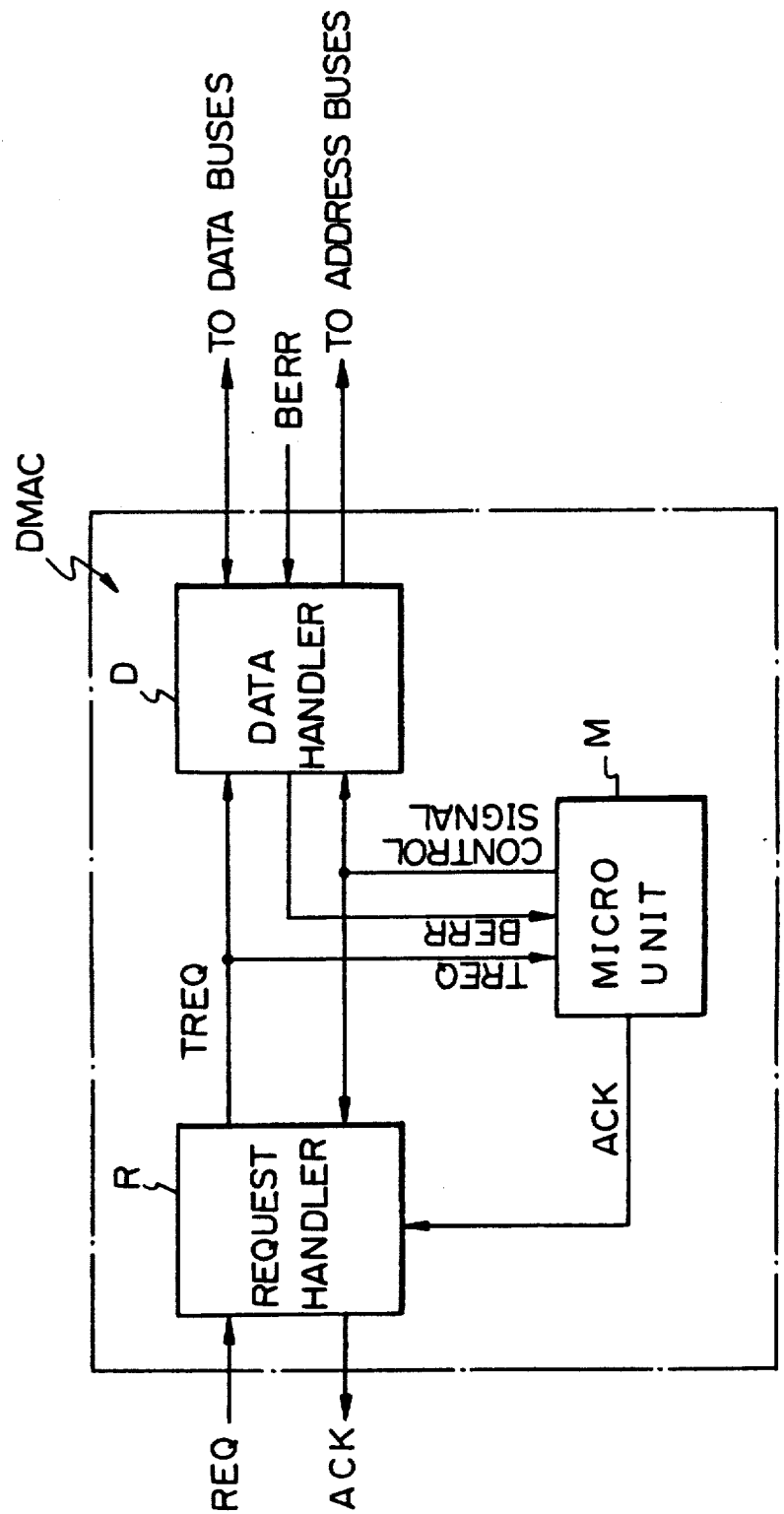
FIG. 2 is a view explaining the DMA controller.

In this connection, it is conceived to apply the microprogram control to the DMA controller. FIG. 2 is a schematic view showing the internal construction of the DMA controller (DMAC) to which the microprogram control is applied, which controller may be comprised of a request handler R, data handler D, and μ(micro)unit M. When, for example, a transfer request signal REQ from the I/O unit (or an autorequest signal automatically generated based on a start instruction from the CPU upon data transfer between memories) is received, the request handler R sends out a predetermined data transfer program processing request signal TREQ to the data handler D and microunit M. The microunit M includes a microsequencer which outputs a control signal for controlling the data handler D and the request handler R, an arithmetic and logic unit (ALU) for calculating transfer addresses, a counter for counting the number of transfer bytes, various kinds of control registers, an error processing circuit, etc. The microunit M, based on the transfer request signal TREQ, sends control signal to the data handler D and request handler R for the predetermined data transfer. By this, predetermined data transfer (for example, successive reading of predetermined bytes of data from the predetermined addresses of the memory M1 and successive writing of the data to the predetermined addresses of the memory M2) is performed through the data handler D, data buses, address buses, etc. Note that in FIG. 2, BERR is a bus error signal, described later, which is sent from the outside through the data handler D to the microunit M.

Figure 3:
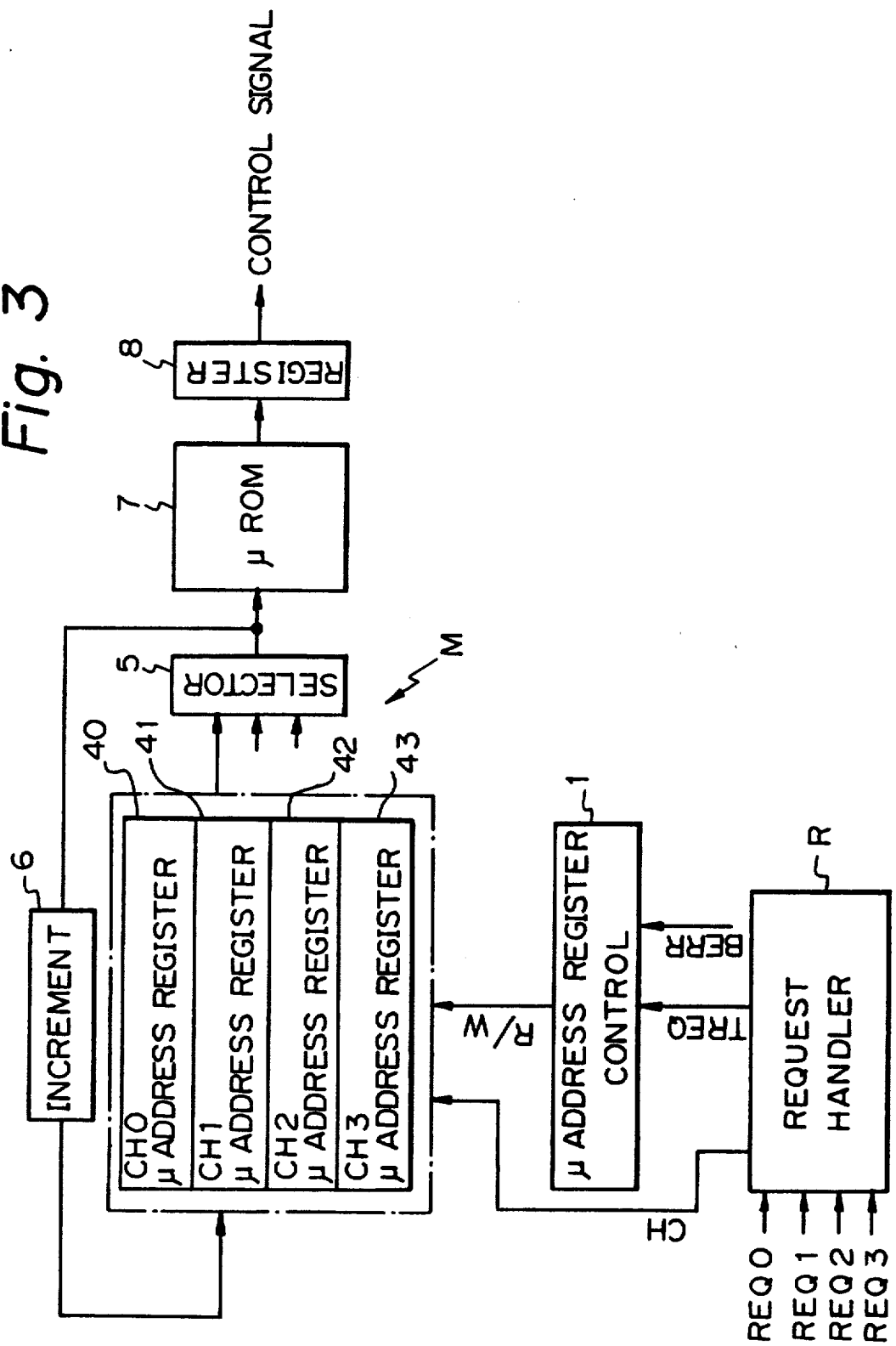
FIG. 3 is a block diagram showing an example of a DMA data transfer controlling apparatus.

The DMA data transfer controlling apparatus of the present invention features an improvement of a part of the above-mentioned microunit functioning as the control unit for controlling the data transfer through the DMA controller. FIG. 3 illustrates the construction of the corresponding portion of the microunit as shown in FIG. 2.

Figure 13:
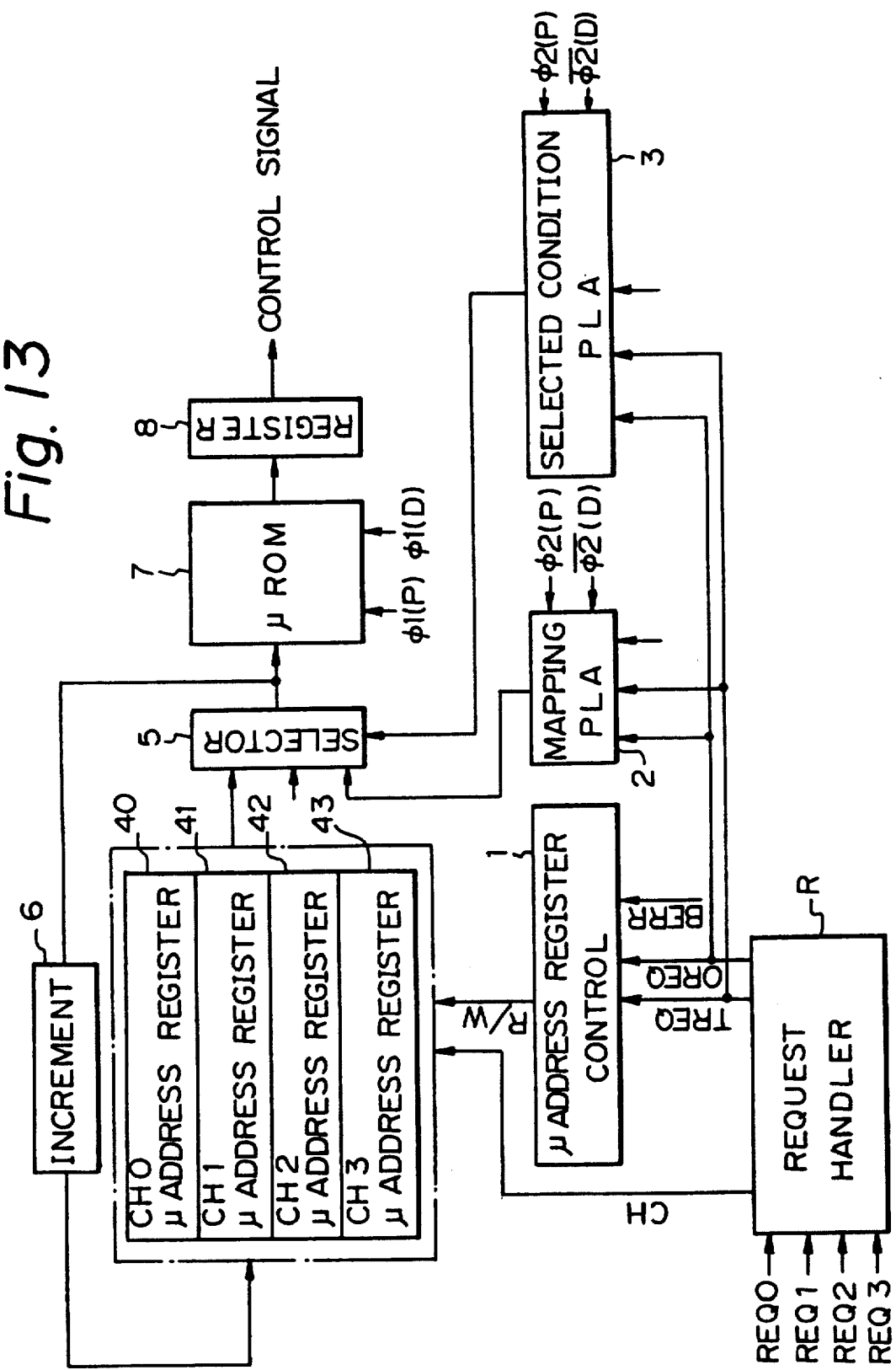
FIG. 13 is a block diagram showing an example of a DMA data transfer controlling apparatus including a start processing execution portion.

That is, in FIG. 3, R indicates the request handler. The other portions (that is, the microaddress register control unit 1, microaddress registers 40 to 43 corresponding to the channel 0 to channel 3, selector 5, incremental element 6, micro read only memory (μROM) 7, and register 8) constitute the above-mentioned portion of the microunit M. That is, what the above-mentioned FIG. 3 shows is a 4-channel DMA data transfer controlling apparatus. Transfer request signals REQ0 to REQ3 are input from four sets of I/O units to the request handler R. In accordance with the input of the transfer request signals, a predetermined channel indication signal CH is input from the request handler R to the microaddress registers and a transfer program processing request signal TREQ is input to the microaddress register control unit 1. Reading and writing signals R/W are supplied from the microaddress register control unit 1 to the microaddress register of the designated channel (for example, 41). Microaddress information for data transfer for each channel is stored in the microaddress registers 40 to 43 for each channel. The initial value of the microaddress information is written into each microaddress register by a means such as shown in FIG. 13, for example, described later. Next, when the microaddress information stored in a predetermined microaddress register is read out, the read out microaddress information is input through the selector 5 to the μROM (ROM in which the later mentioned microprogram is stored) 7. Also, using the incremental element 6, the content of the microaddress information is incremented and again written into the microaddress register (for example, 41) of the corresponding channel. By this, the microinstruction stored in the corresponding address is read out from the μROM 7, then the read out microinstruction is taken into the register 8 and a control signal for the data transfer for the corresponding channel is output from the register 8 to, for example, the above-mentioned data handler D. Note that the microaddress register control unit 1 receives as input the above-mentioned bus error signal BERR as well.

FIG. 4 is a timing chart for explaining the operation of the apparatus of FIG. 3. When the clock $\phi 1$ is high level, the μROM 7 is precharged. When the clock $\phi 1$ becomes low level, the μROM 7 is discharged. FIG. 4 shows the case of three cycles (T1 to T3) of external transfer cycles with respect to a predetermined channel. MD indicates an output (microinstructions) read out from the μROM 7 with each cycle. MA indicates the microaddress information read out from the microaddress register (for example, 41) with each cycle. That is, in FIG. 4, for example, T1D is a microinstruction for executing an external transfer cycle T1 for a predetermined channel, and T1A is microaddress information supplied from the microaddress register (for example, 41) to the μROM 7 for causing the microinstruction T1D to be output from the μROM 7. Note that the clock $\phi 2$ shows the timing by which the output read out from the μROM 7 is taken into the register 8.

Here, in the DMA data transfer controlling apparatus shown in FIG. 3, as shown in FIG. 4, after the microprogram processing for one channel, for example channel 1, is completed, processing proceeds for receiving the transfer program processing request signal TREQ for another channel (in FIG. 4, transfer request signal for channel 0). That is, in FIG. 4, the above-mentioned transfer request signal TREQ is output at the final cycle in the transfer cycles of the channel 1 (in this case, the T3 cycle) (that is, after the data transfer of the channel 1 has been correctly executed). By this, the channel indication signal CH is changed from the channel 1 to channel 0.

However, if a transfer request signal TREQ is output at this timing, a dead cycle corresponding to one cycle (shown a DEAD in FIG. 4) will enter between the external transfer cycle before the changeover (here, the transfer cycle of channel 1) and the external transfer cycle after the changeover (here, the transfer cycle of channel 0).

That is, a predetermined microaddress information (for example, T1A) read out from a predetermined microaddress register (for example, 41) is supplied to the μROM 7, then during the discharge period of the μROM 7, a microinstruction (for example, T1D) corresponding to the microaddress information (for example, T1A) is output from the μROM 7, so, as shown in FIG. 4, there is a deviation of one cycle between the timing by which the microaddress information (for example, T1A) is read out from the corresponding microaddress register and the timing of the external transfer cycle F1 executed corresponding to the same. Therefore, a dead cycle corresponding to one cycle is generated to enter from the transfer cycle of the channel 1 to the transfer cycle of the next channel (in this case, channel 0), i.e., to perform the channel transition, due to the receipt of the transfer request signal TREQ and this delays the operation of the apparatus correspondingly.

To eliminate the above problem, it is conceived to send the above-mentioned transfer request signal TREQ to the microunit M before the end of the microprogram processing of the channel 1, i.e., at the T2 cycle, as shown in FIG. 5, so as to prepare for the next transfer in advance in the microunit.

However, when the transfer request signal TREQ is output at this timing, even if a bus error arises during the data transfer of the channel 1 and thus a bus error signal BERR is sent in from the outside (the bus error signal BERR being sent in at the final transfer cycle T3 of the above-mentioned channel 1), the channel for the next data transfer (that is, the channel 0) will already be switched to by the output of the transfer request signal TREQ before that (at the above-mentioned T2 cycle). As a result, there will be the mistaken judgment that the above-mentioned bus error has arisen in the data transfer of the above-mentioned channel 0 after the changeover. That is, in the case of a transfer program processing request made at the timing shown in FIG. 5, there is the problem that, despite the bus error having arisen in the data transfer of the channel 1, the switching to the above-mentioned channel 0 before detection of this will lead to the destruction of the microaddress information of the microaddress register of the channel 0 (that is, the information of the microaddress register of the channel 0 will be rewritten to the microaddress information for the bus error processing) due to the mistaken judgment. Therefore, it is impossible, with the apparatus shown in FIG. 3, to output a transfer program processing request signal TREQ at the timing shown in FIG. 5.

Figure 6:
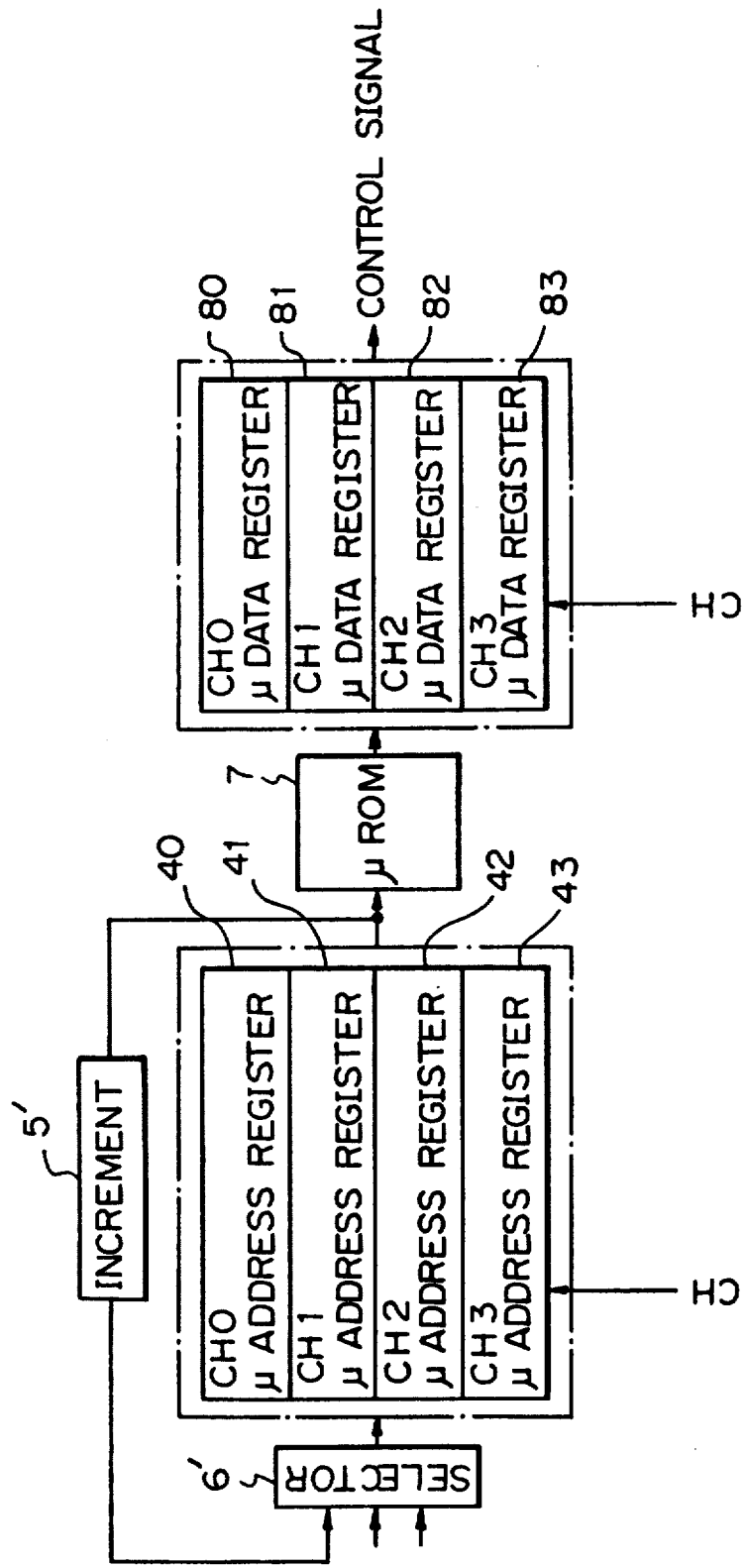
FIG. 6 is a block diagram showing another example of a DMA data transfer controlling apparatus.

As another means for eliminating the above-mentioned problem in the case of output of a transfer request signal TREQ at the timing shown in FIG. 4, as shown in FIG. 6, it has been conceived to provide registers 40 to 43 and 80 to 83, corresponding to the channels, as microaddress registers and microdata registers (corresponding to the register 8 in FIG. 3) and to immediately, upon the transmission of a transfer request signal TREQ to the microunit, change the microaddress register and microdata register to the registers for the next channel (Japanese Unexamined Patent Publication (Kokai) No. 59-100956). In this case, changeover of the microdata registers is possible by just changing the channels, so there is no dead cycle such as shown in FIG. 4, but when the microinstructions output from the μROM are long in bit length (for example, 70 to 80 bits), the provision of a number of microdata registers corresponding to the plurality of channels as mentioned above would lead to an increase in the physical amount and therefore would be disadvantageous in view of cost and integration density.

The present invention was made to eliminate the above-mentioned problems accompanying bus error processing.

Figure 7:
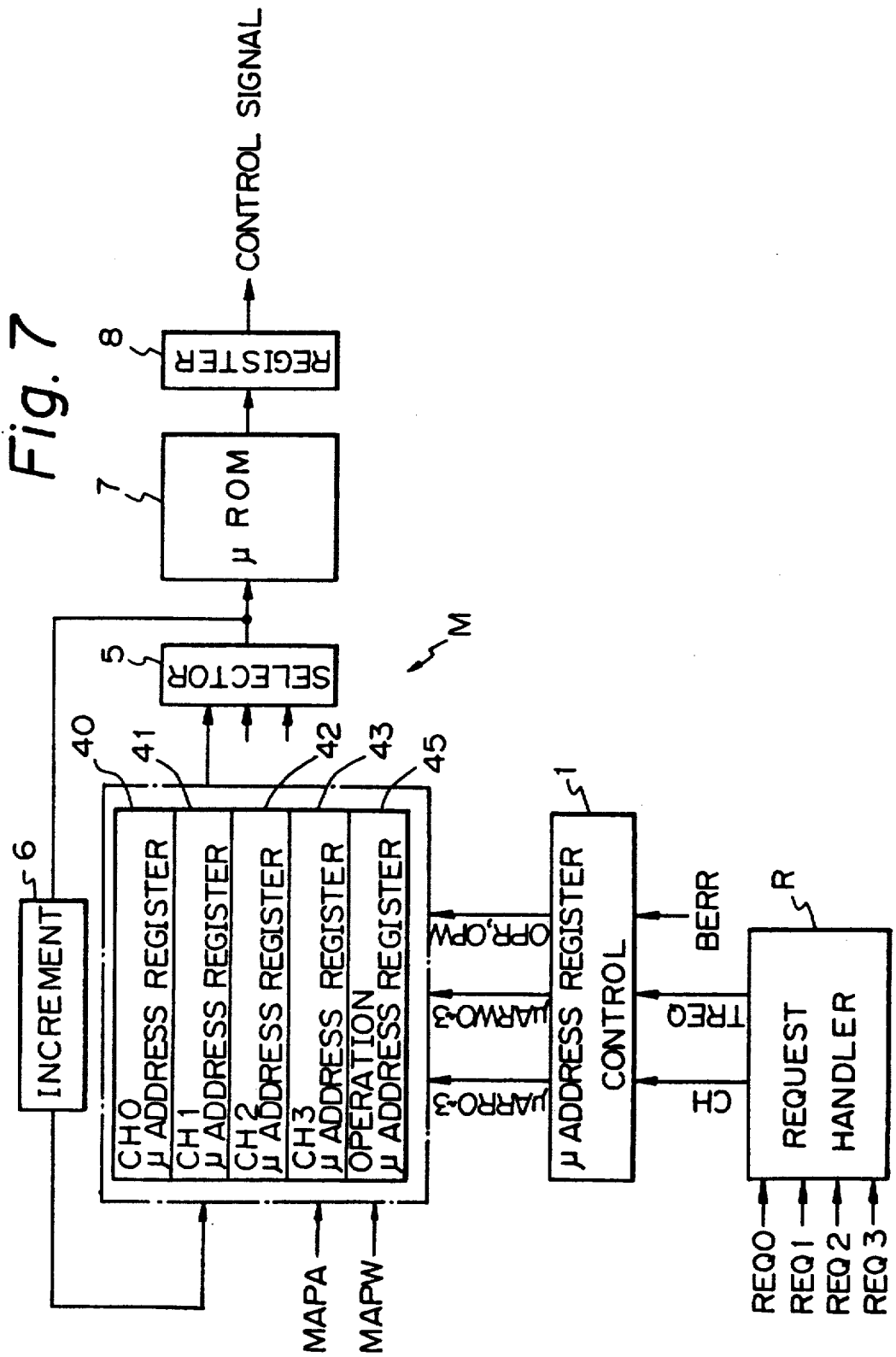
FIG. 7 is a block diagram showing a DMA data transfer controlling apparatus according to a first embodiment of the present invention.

FIG. 7 shows a DMA data transfer controlling apparatus according to a first embodiment of the present invention. Here, the major difference with the apparatus shown in FIG. 3 lies in the addition, as a microaddress register, of an operational microaddress register 45 for performing program processing exclusively for operations (program processing other than the above-mentioned data transfer program processing). When a bus error signal BERR or other exception signal is input into the microaddress register control unit 1, the read and write operations on the operational microaddress register 45 are controlled by the signals OPR and OPW output from the microaddress register control unit 1. That is, the signals OPR and OPW are not produced while the data transfer program processing is being executed, but are output when bus error processing or other operational program processing is being executed, and control the above-mentioned operational microaddress register 45. On the other hand, while the data transfer program processing is being executed, the read signals μARR0 to μARR3 and write signals μARW0 to μARW3 for the microaddress registers 40 to 43 corresponding to the predetermined channel are output from the microaddress register control unit 1 in accordance with the channel indication signal CH and transfer program processing request signal TREQ input from the request handler R to the microaddress register control unit 1. Note that MAPA and MAPW shown in FIG. 7 are microaddress information written in the microaddress registers 40 to 43 as initial value and the write instruction for the microaddress information MAPA, respectively.

Figure 8:
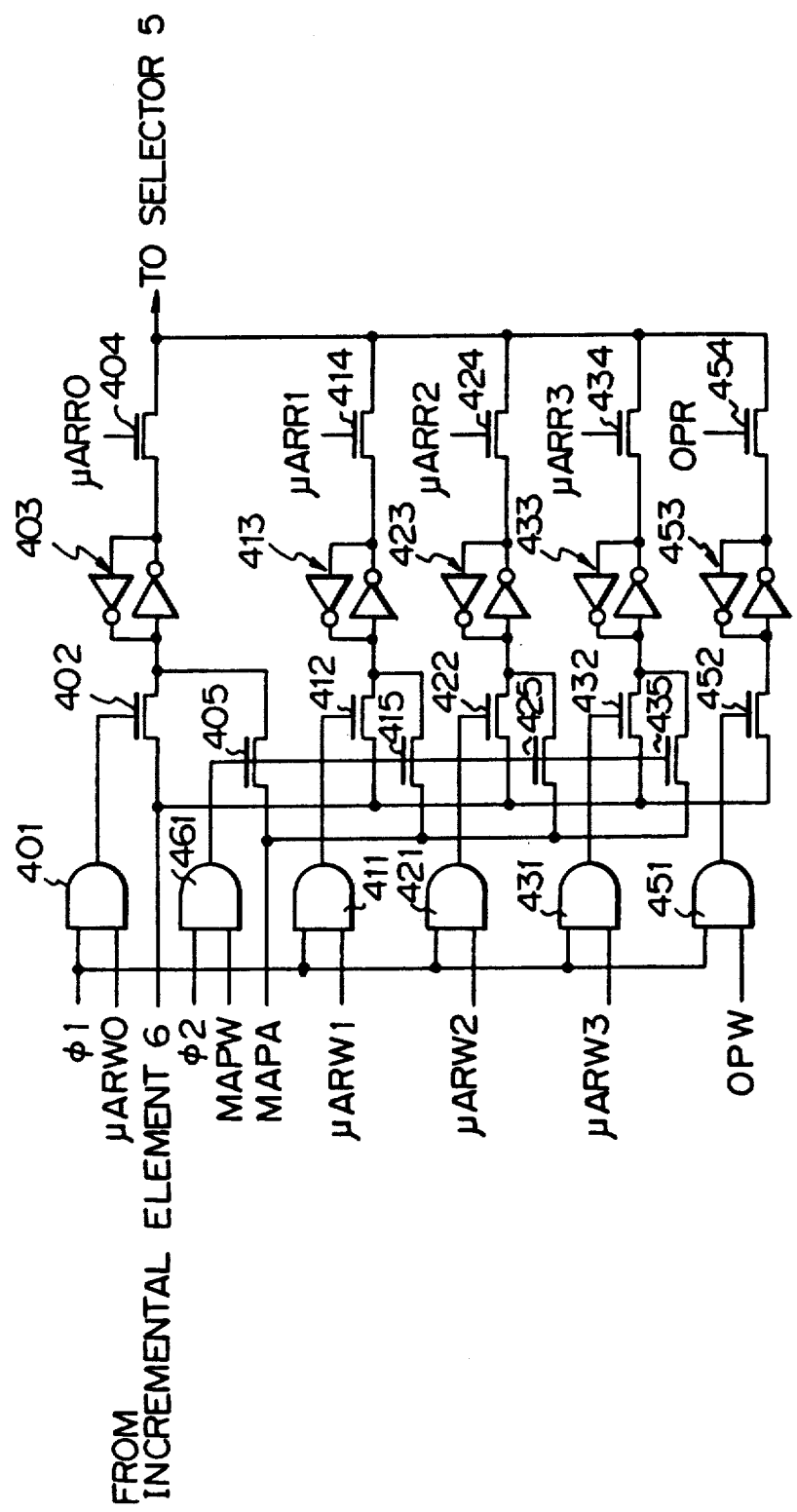
FIG. 8 is a circuit diagram illustrating the internal construction of the microaddress registers shown in FIG. 7.

FIG. 8 is a circuit diagram illustrating the internal construction of the microaddress registers shown in FIG. 7. The microaddress registers 40 to 43 provided for each channel are comprised of AND gates 401 to 431, transistors 402 to 432, latch circuits 403 to 433, and transistors 404 to 434. The above-mentioned operational microaddress register 45 is comprised of the AND gate 451, transistor 452, latch circuit 453, and transistor 454. The microaddress registers provided for each channel are provided with an AND gate 461 and transistors 405 to 435 for writing the initial microaddress information MAPA into the latch circuits 403 to 433 in accordance with the above-mentioned write instruction MAPW. Note that in FIG. 8, only one bits worth of microaddress registers for the channels is shown, but in actuality, the construction is such to enable writing and reading of a predetermined number of bits of microaddress information for each channel.

Therefore, when the write signal μARW0 for the data transfer microaddress register 40 corresponding to the channel 0, for example, becomes high level at the time when the above-mentioned clock signal $\phi 1$ is high level, the transistor 402 is turned on through the AND gate 401 and predetermined microaddress information is written into the latch circuit 403 from the incremental element 6 side. On the other hand, when the read signal μARR0 for the microaddress register 40 becomes high level, the transistor 404 is turned on and microaddress information stored in the latch circuit 403 is read out. In the same way, when the write signal OPW for the operational microaddress register 45 becomes high level at the time when the above-mentioned clock signal $\phi1$ is high level, the transistor 452 is turned on through the AND gate 451 and predetermined microaddress information is written into the latch circuit 453 from the incremental element 6 side. On the other hand, when the read signal OPR for the microaddress register 45 becomes high level, the transistor 454 is turned on and the microaddress information stored in the latch circuit 453 is read out.

Further, when the above-mentioned write instruction MAPW becomes high level at the time when the clock signal $\phi2$ is high level, the above-mentioned transistors 405 to 435 are turned on through the AND gate 461 and microaddress information MAPA is written as initial value into the latch circuits 403 to 433. In this way, the microaddress registers 40 to 43 for data transfer program processing are provided with a route for writing the microaddress information MAPA as initial value and a route for writing the microaddress information incremented by the incremental element.

Figure 9:
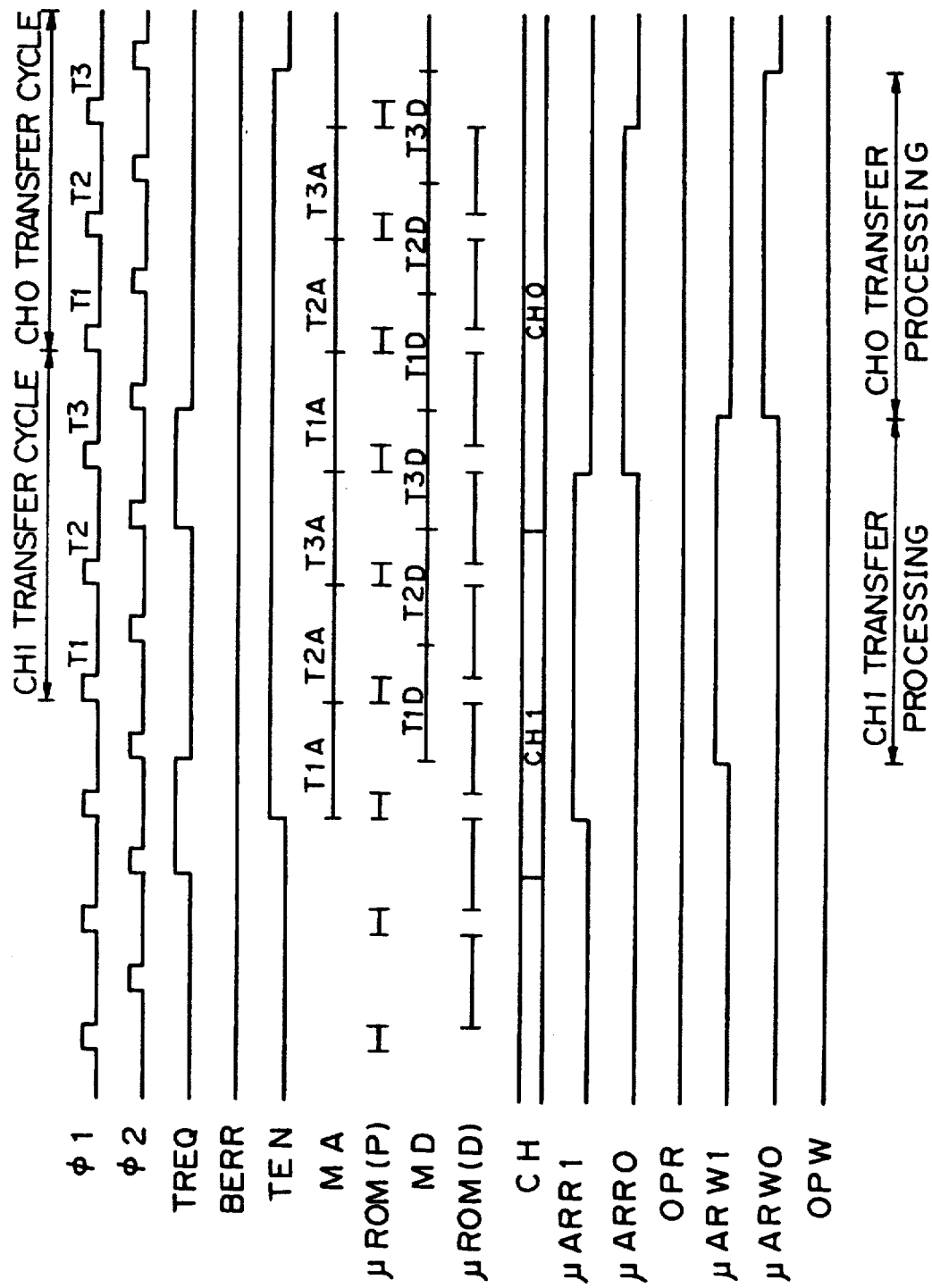
FIG. 9 is a view showing the operation timing of the apparatus of FIG. 7 (in the case of no bus error)

FIG. 9 is a timing chart explaining the operation of the apparatus shown in FIG. 7 in the case where no bus error has occurred. When the clock signal $\phi1$ is high level, the $\mu$ROM 7 is precharged (see $\mu$ROM(P)). When the clock signal $\phi1$ is low level, the $\mu$ROM 7 is discharged (see $\mu$ROM (D)). The transfer program processing request signal TREQ is sent at the T2 cycle in the same way as the timing shown in FIG. 5, whereby channel transition (changeover from channel 1 to channel 0) is performed. TEN is a transfer enable signal which becomes high level when a transfer program processing request signal TREQ is received. Internal transfer processing is performed while the signal TEN is high level. The read signal for the microaddress register (for example, $\mu$ARR1) is output starting when the clock signal $\phi1$ is high level. When the clock signal $\phi1$ is low level, the read operation is performed. The microaddress information read out in this way is incremented as mentioned above, the write signal for the microaddress register (for example, $\mu$ARW1) becomes high level at the timing when the clock signal $\phi2$ becomes high level, then the write operation is performed through the above-mentioned AND gate (for example, 411) when the clock signal $\phi1$ becomes high level. In this case, the transfer program processing request signal TREQ is sent out at the T2 cycle in the transfer cycles of the channel 1, as mentioned above, so the transfer program processing of the channel 0 is started immediately after the completion of the transfer program processing of the channel 1 without a dead cycle.

In this way, even during channel transition, the microaddress informations T1A to T3A output from the microaddress registers provided for each channel and the microinstructions T1D to T3D output from the $\mu$ROM in accordance with the same are successively output without a dead cycle, whereby, for example, the transfer cycles of the channel 0 are started immediately after the end of the transfer cycles of the channel 1, for example, without a dead cycle.

Figure 10:
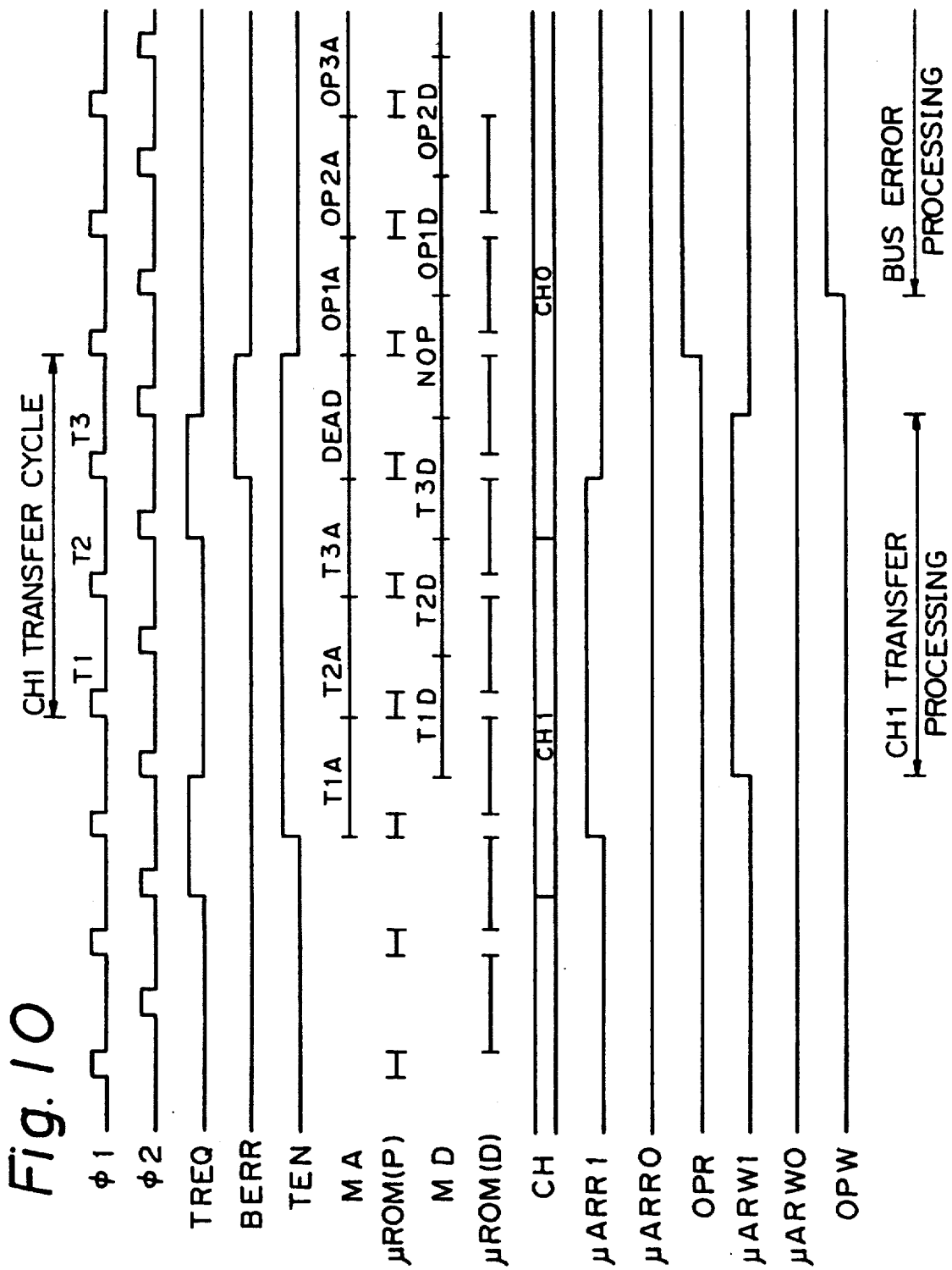
FIG. 10 is a view showing the operation timing of the apparatus of FIG. 7 (in the case of bus error)

FIG. 10 is a timing chart explaining the operation of the apparatus shown in FIG. 7 in the case where a bus error has occurred. The difference with the timing chart of FIG. 9 lies in the fact that the bus error signal BERR, showing the occurrence of a bus error during the transfer processing of the channel 1, becomes high level at the final transfer cycle of the channel 1 (T3 cycle), whereby the transfer enable signal TEN changes from high level to low level and, thus, there is a change from execution of data transfer program processing to execution of operational program processing (bus error processing, start processing, and other program processing other than data transfer program processing). As a result, after the end of the transfer program processing of the channel 1, the read signal OPR and further the write signal OPW for the operational microaddress register 45 become high level and the program processing is performed to handle the above bus error.

In this case, as shown in FIG. 10, after the microaddress informations T1A to T3A for executing the transfer processing for the channel 1 are output as output MA from the microaddress register, there is a dead cycle corresponding to one cycle (shown by DEAD in the figure). Then, at the time when the read signal OPR becomes high level, the operational (for example, bus error processing) microaddress informations OP1A, OP2A, . . . are output successively from the microaddress register 45 until the end of the operational program processing.

As the microinstructions MD output from the $\mu$ROM 7 in accordance with this, the microinstructions T1D to T3D for execution of the transfer processing of the channel 1 are output, then a no-operation state is entered by one cycle (shown by NOP in the figure). Next, the microinstructions OP1D, OP2D, . . . for executing the operational program processing (here, bus error processing) are output successively from the $\mu$ROM until the end of the operational program processing.

In this way, even if a bus error signal BERR is sent in at the final transfer cycle of the channel 1, there will be no destruction of the contents of the microaddress register of the channel 0 due to the changeover from data transfer program processing to operational program processing (in this case, bus error processing).

Figure 11:
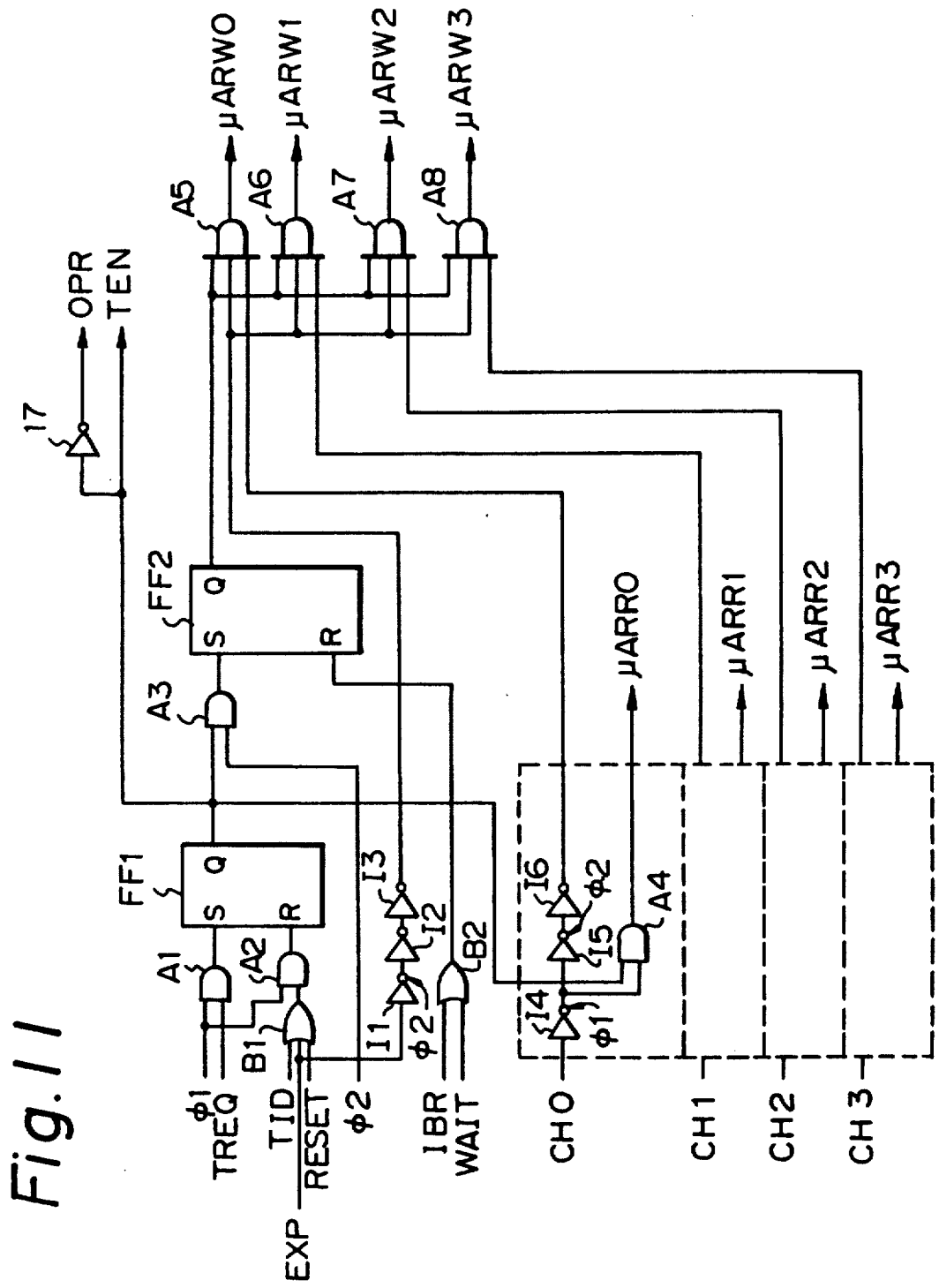
FIG. 11 is a circuit diagram illustrating part of the construction of the microaddress register control unit shown in FIG. 7.

FIG. 11 is a circuit diagram showing, in the microaddress register control unit 1 shown in FIG. 7, the detailed construction of the portion for outputting the read signals $\mu$ARR0 to $\mu$ARR3 and write signals $\mu$ARW0 to $\mu$ARW3 for the data transfer microaddress registers 40 to 43 provided for each channel, the transfer enable signal TEN, and the read signal OPR for the operational microaddress register 45. Further, FIG. 12 is a circuit diagram showing, in the microaddress register control unit 1 shown in FIG. 7, the detailed construction of the portion for outputting the write signal OPW for the operational microaddress register 45.

Figure 12:
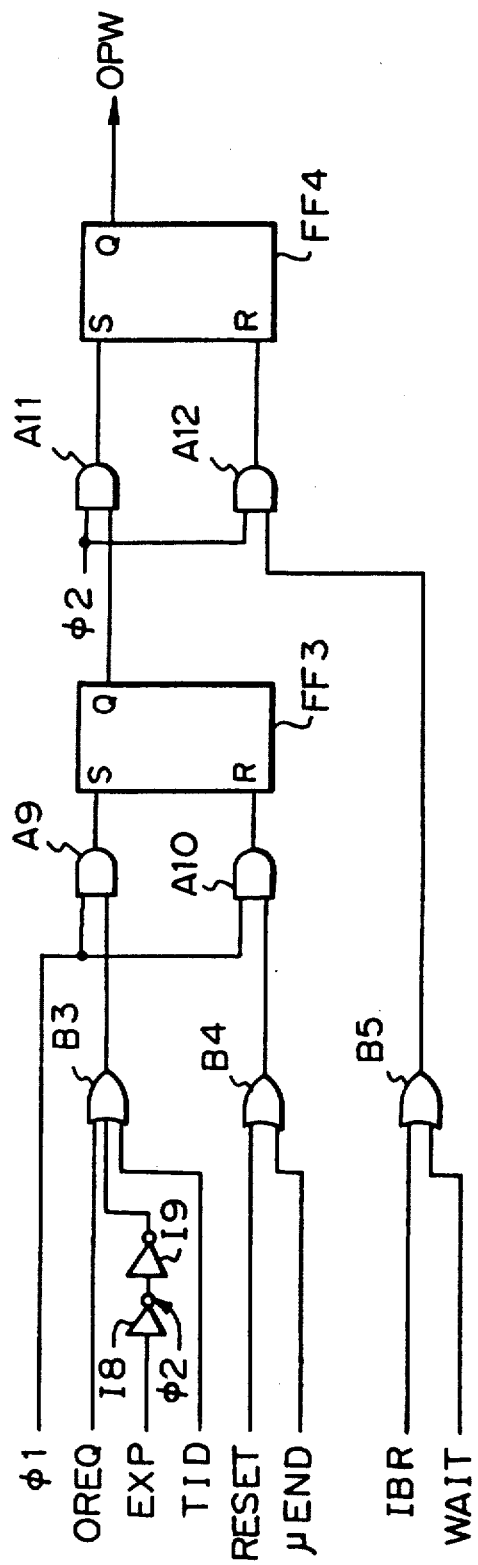
FIG. 12 is a circuit diagram illustrating the construction of the other part of the microaddress register control unit shown in FIG. 7.

In FIG. 11 and FIG. 12, A1 to A12 are AND gates, B1 to B5 are OR gates, and I1 to I9 are inverters, among which the inverter I4 operates when the clock signal $\phi1$ is high level and enters a floating state while it is low level. However, in the present embodiment, the inverter operates as a dynamic latch by the shortening of the period of the clock signal $\phi1$ and maintains the former level until the next clock signal $\phi1$ is input. Further, the inverters I1, I5, and I8 operate when the clock signal $\phi2$ is high level and enter a floating state while it is low level. However, in the present embodiment, in the same way as above, these operate as dynamic latches and maintain the former levels until the next clock signal $\phi2$ is input. FF1 to FF4 are RS flipflops, among which FF1 to FF3 are reset priority type RS flipflops (that is, when the set input S and reset input R are both 0, hold the former data, when the set input S is 1 and the reset input R is 0, enter the set state (that is, Q=1), and when the set input S is 0 and the reset input R is 1 and when the set input S and the reset input R are both 1, enter the reset state (that is, Q=0)).

Among the signals input to the circuit shown in FIG. 11, T1D is a transfer processing end request signal and EXP is an exception signal, the above-mentioned bus error signal being included therein. Further, IBR is an internal data bus use request signal, WAIT is a wait request signal, and CH0 to CH3 are indication signals for the channels 0 to 3, the potentials of the signals CH0 to CH3 being low level under the active state. Further, among the signals input to the circuit shown in FIG. 12, OREQ is an operational processing request signal and μEND is an operation processing end request signal.

By this, when the above exception signal EXP is low level, if the clock signal $\phi 1$ and transfer request signal TREQ become high level, the flipflop FF1 is set and the transfer enable signal TEN becomes high level. By designation of a predetermined channel (for example, when CH0 becomes low level), the read signal μARR0 for the microaddress register 40 corresponding to the channel 0 becomes high level. Further, when the next clock signal $\phi 2$ is high level, the flipflop FF2 is set and the write signal μARW0 for the microaddress register 40 becomes high level.

On the other hand, when the above-mentioned exception signal EXP becomes high level (for example, when a bus error, etc. occurs), the above-mentioned flipflops FF1 and FF2 are reset and the read signals μARR0 to μARR3 and write signals μARW0 to μARW3 of the microaddress registers corresponding to each channel become low level, while the read signal OPR for the operational microaddress register 45 becomes high level. Further, in the circuit shown in FIG. 12, when the above-mentioned exception signal EXP becomes high level, the write signal OPW for the operational microaddress register 45 becomes high level through the successive setting of the flipflops FF3 and FF4.

In this way, according to the present invention, even when a bus error signal or the like is sent in after a data transfer channel is switched, there is no destruction of the contents of the microaddress register corresponding to a channel changed to, there is not that great an increase in the physical amount, and channel transition is possible without a dead cycle.

Further, in the present invention, it is possible to make use of the operational microaddress register provided to eliminate the problems accompanying bus error processing so as to achieve high speed start processing of data transfer for the channels without a dead cycle.

FIG. 13 illustrates the construction of the portion of the microunit M as shown in FIG. 2 including the portion for executing start processing.

In FIG. 13, R indicates the request handler. The other portions (that is, the microaddress register control unit 1, mapping programmable logic array (mapping PLA) 2, selected condition programmable logic array (selected condition PLA) 3, microaddress registers 40 to 43 for the channel 0 to channel 3, selector 5, incremental element 6, micro read only memory (μROM) 7, and register 8) constitute the above-mentioned portion of the microunit M. That is, what the above-mentioned FIG. 13 shows, like FIG. 3, is a 4-channel DMA data transfer controlling apparatus. Transfer request signals REQ0 to REQ3 are input from four sets of I/O units to the request handler R, for example. In accordance with the input of the transfer request signals, a predetermined channel indication signal CH is input from the request handler R to the microaddress registers and a transfer program processing request signal TREQ is input to the microaddress register control unit 1. Reading and writing signals R/W are supplied from the microaddress register control unit 1 to the microaddress register of the designated channel (for example, 40). By this, when the microaddress information stored in a predetermined microaddress register is read out, the read out microaddress information is input through the selector 5 to the μROM 7. Using the incremental element 6, the content of the read out microaddress information is incremented and again written into the microaddress register (for example, 40) of the corresponding channel. By this, the microinstruction stored in the corresponding address of the μROM 7 is read out, then the microinstruction is taken into the register 8 and a control signal for the data transfer for the corresponding channel is output from the register 8 to, for example, the above-mentioned data handler D.

The selector 5 receives as input not only the microaddress information read out from the above-mentioned microaddress registers 40 to 43, but also, for example, microaddress information read out from the mapping PLA 2, etc. In accordance with the select signal supplied from the selected condition PLA 3, just predetermined microaddress information is selectively input through the selector 5 to the μROM 7. Here, the mapping PLA functions as a so-called "jump table" for the μROM which designates, in accordance with conditions input to the mapping PLA, the microaddress information as the initial value (e.g., the starting address, jumping address, etc.) from which the μROM must operate.

Figure 14:
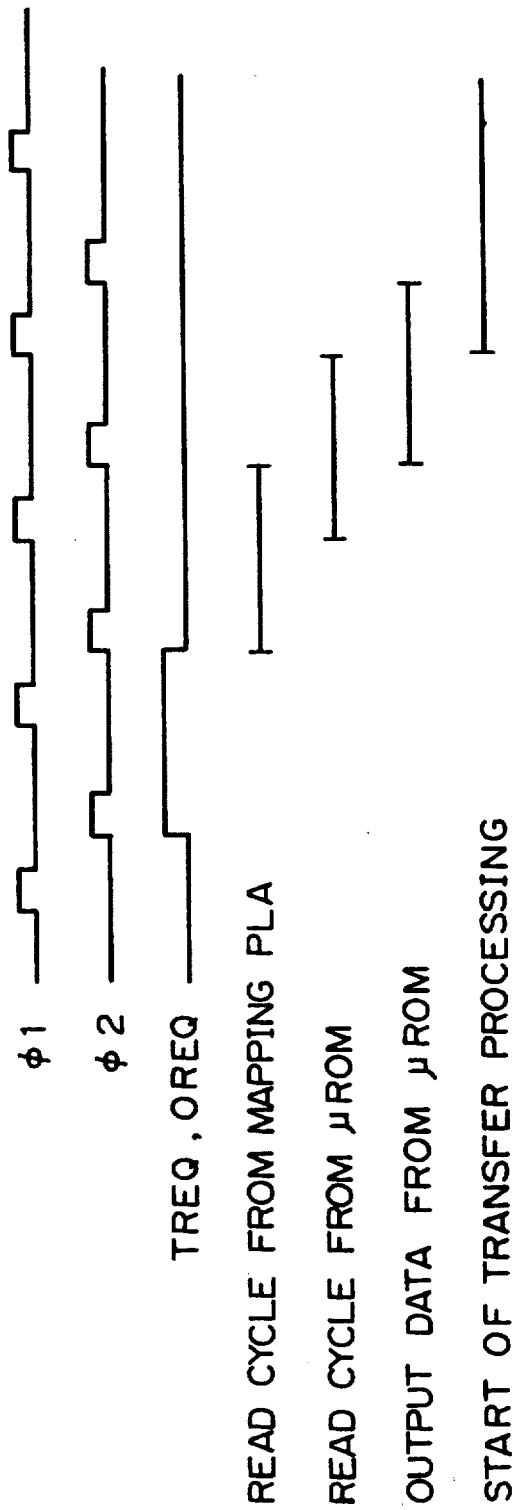
FIG. 14 is a timing chart showing the operation of the apparatus of FIG. 13.

FIG. 14 is a timing chart showing the start sequence in the case of start processing of a microprogram by the apparatus shown in FIG. 13. First, a data transfer processing request signal TREQ is output from the request handler R. Based on the request signal TREQ, predetermined microaddress information is read out from the mapping PLA 2. Based on the readout microaddress information, data (microinstruction) of the μROM is read out. Based on the readout output data of the μROM, predetermined data transfer processing is started through the above-mentioned data handler D. Note that the μROM 7 is precharged when the clock signal $\phi 1$ is high level and is discharged when the clock signal $\phi 1$ is low level. Further, the mapping PLA 2 and selected condition PLA 3 are precharged when the clock signal $\phi 2$ is high level and discharged when the clock signal $\phi 2$ is low level.

In this way, in the apparatus shown in FIG. 13, the microaddress information read out from the mapping PLA 2 is input directly through the selector 5 to the μROM 7, so as shown by the timing chart of FIG. 14, it takes about two cycles (two clocks worth of time) from when the above-mentioned transfer request signal TREQ is input into the mapping PLA 2 until the above-mentioned transfer processing starts. This is true not only when the above-mentioned data transfer processing request signal TREQ is input, but it takes about two cycles even in the case from when an operation processing (for example, start processing executed before the actual data transfer processing is performed and other program processing other than data transfer program processing) request signal OREQ is input from the request handler R to the mapping PLA 2 to the start of the predetermined operation processing (for example, start processing). This leads to a decline in the start processing speed.

The present invention also eliminates the problems accompanying start processing.

Figure 15:
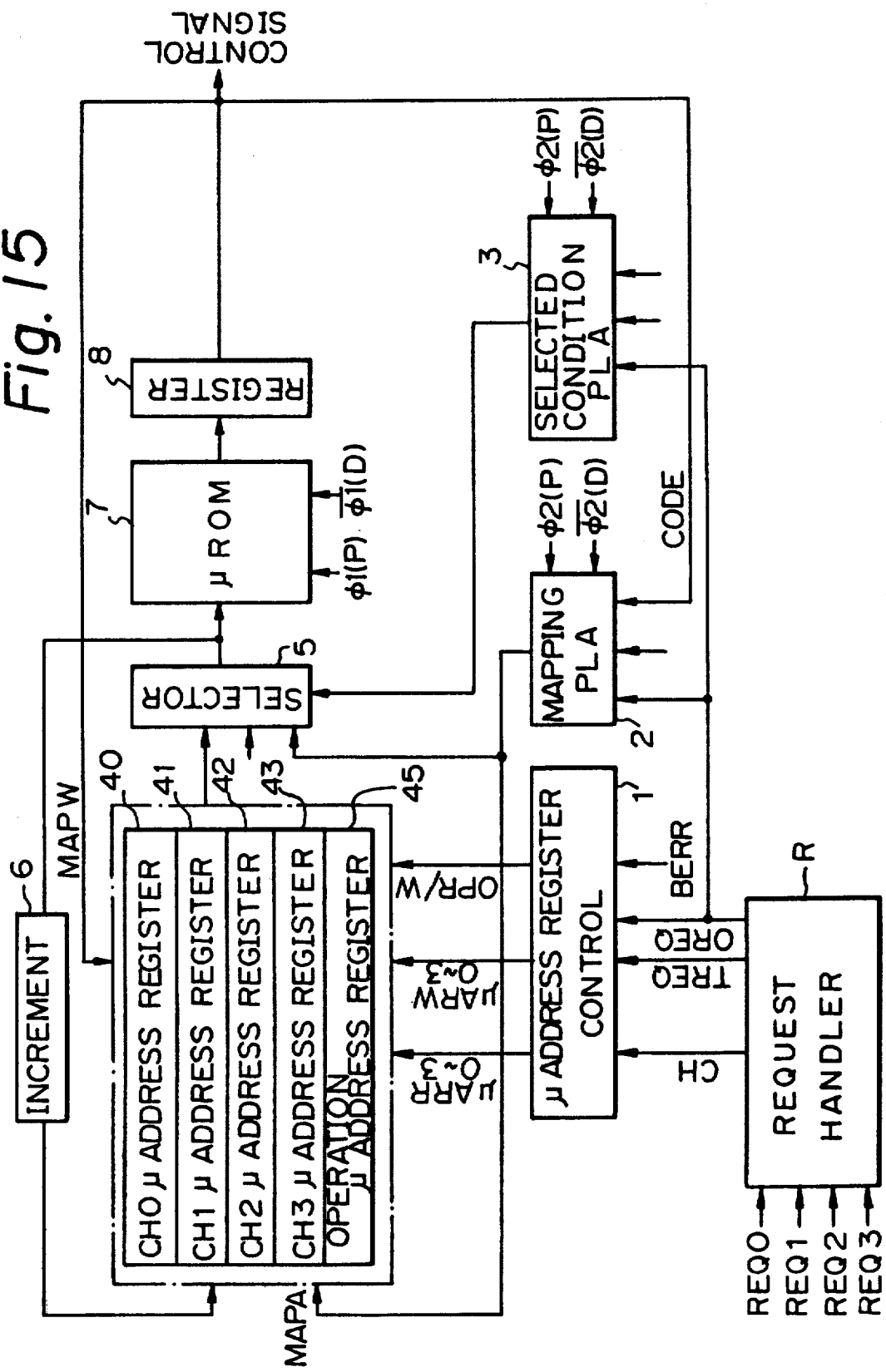
FIG. 15 is a block diagram showing a DMA data transfer controlling apparatus according to another embodiment of the present invention, including the above-mentioned start processing execution portion.

FIG. 15 shows a DMA data transfer controlling apparatus according to another embodiment of the present invention for eliminating the above problems. Portions common to the embodiment shown in FIG. 7 are given the same reference numerals and symbols. The major difference with the apparatus shown in FIG. 13 lies in the provision, as a microaddress register, of an operational microaddress register 45 for performing program processing exclusively for operations (for example, start processing, bus error processing, and other program processing other than data transfer program processing) and, during the operation of the operational microaddress register 45 (for example, during start processing), the microaddress information MAPA as initial value read out from the mapping PLA 2 is written into the data transfer microaddress registers 40 to 43 provided for each channel. Note that in FIG. 15, MAPW is a write instruction supplied from the $\mu$ROM 7 through the register 8 to the predetermined microaddress registers 40 to 43. The microaddress information MAPA read out as initial value from the mapping PLA 2 is thus written into the data transfer microaddress registers 40 to 43 during the operation of the operational microaddress register 45. Further, a read instruction CODE of the microaddress information MAPA is supplied from the $\mu$ROM 7 through the register 8 to the mapping PLA 2.

Note that in the apparatus shown in FIG. 15, when the normal data transfer program processing is being executed, in accordance with the channel indication signal CH and transfer request signal TREQ input from the request handler R to the microaddress register control unit 1, read signals $\mu$ARR0 to $\mu$ARR3 and write signals $\mu$ARW0 to $\mu$ARW3 are supplied from the microaddress register control unit 1 to the microaddress register corresponding to the predetermined channel. Further, when a bus error signal BERR or other exception signal is input into the microaddress register control unit 1, the read and write operations for the operational microaddress register 45 are controlled by the signals OPR and OPW output from the microaddress register control unit 1, as explained with regard to the embodiment of FIG. 7.

The internal construction of the microaddress registers shown in FIG. 15 is illustrated in FIG. 8. That is, the data transfer microaddress registers 40 to 43 provided for each channel are comprised of AND gates 401 to 431, transistors 402 to 432 to which are supplied write signals $\mu$ARW0 to $\mu$ARW3 from the AND gates 401 to 431, latch circuits 403 to 433, transistors 404 to 434 to which are supplied read signals $\mu$ARR0 to $\mu$ARR3 for reading microaddress information stored in the latch circuits, and transistors 405 to 435 to which are supplied, through the common AND gate 461, a write signal MAPW from the $\mu$ROM. On the other hand, the above-mentioned operational microaddress register 45 is comprised of the AND gate 451, a transistor 452 to which is supplied a write signal OPW from the AND gate 451, a latch circuit 453, and a transistor 454 to which is supplied a read signal OPR for reading microaddress information stored in the latch circuit.

Therefore, when the write signal $\mu$ARW0 for the data transfer microaddress register 40 corresponding to the channel 0, for example, becomes high level at the time when the above-mentioned clock signal $\phi$1 is high level, the transistor 402 is turned on through the AND gate 401 and predetermined microaddress information from the incremental element 6 side is stored in the latch circuit 403. On the other hand, when the read signal $\mu$ARR0 for the microaddress register 40 becomes high level, the transistor 404 is turned on and microaddress information stored in the latch circuit 403 is read out.

In the same way, when the write signal OPW for the operational microaddress register 45 becomes high level at the time when the above-mentioned clock signal $\phi$1 is high level (as mentioned above, the signal OPW becomes high level when a bus error signal BERR or other exception signal is input into the microaddress register control unit 1 or during start processing), the transistor 452 is turned on through the AND gate 451 and predetermined microaddress information from the incremental element 6 side is stored in the latch circuit 453. On the other hand, when the read signal OPR for the microaddress register 45 becomes high level, the transistor 454 is turned on and the microaddress information stored in the latch circuit 453 is read out.

Further, in the present invention, during the operation of the operational microaddress register 45 (for example, during start processing), microaddress information MAPA read out as an initial value from the mapping PLA 2 is written into the data transfer microaddress registers 40 to 43. That is, when the above-mentioned write instruction MAPW supplied from the $\mu$ROM 7 through the register 8 to the data transfer microaddress registers 40 to 43 becomes high level at the time when the clock signal $\phi$2 is high level, the transistors 405 to 435 provided at the data transfer microaddress registers 40 to 43 are turned on through the AND gate 461 and the microaddress information MAPA read out from the mapping PLA 2 is written through the transistors 405 to 435 into the latch circuits 403 to 433. In this way, the microaddress registers 40 to 43 for transfer processing are provided with both a writing route from the incremental element 6 and a writing route for setting initial value from the mapping PLA 2.

That is, during the operation of the operational microaddress register 45 (for example, during start processing), the data transfer microaddress registers 40 to 43 are in an unused state and can be written in with data, so during the start processing, the microaddress information MAPA is read out in advance as initial value from the mapping PLA by the read instruction CODE from the $\mu$ROM. Then, using the write instruction MAPW, the microaddress information MAPA is written into the data transfer microaddress registers 40 to 43. By this, there is no need for reading out microaddress information from the mapping PLA when receiving a data transfer processing request and thus the start processing for the data transfer can be executed at that much a higher speed without a dead cycle.

Note that the construction of the above-mentioned microaddress register control unit 1 is illustrated in FIG. 11 and FIG. 12.

Figure 16:
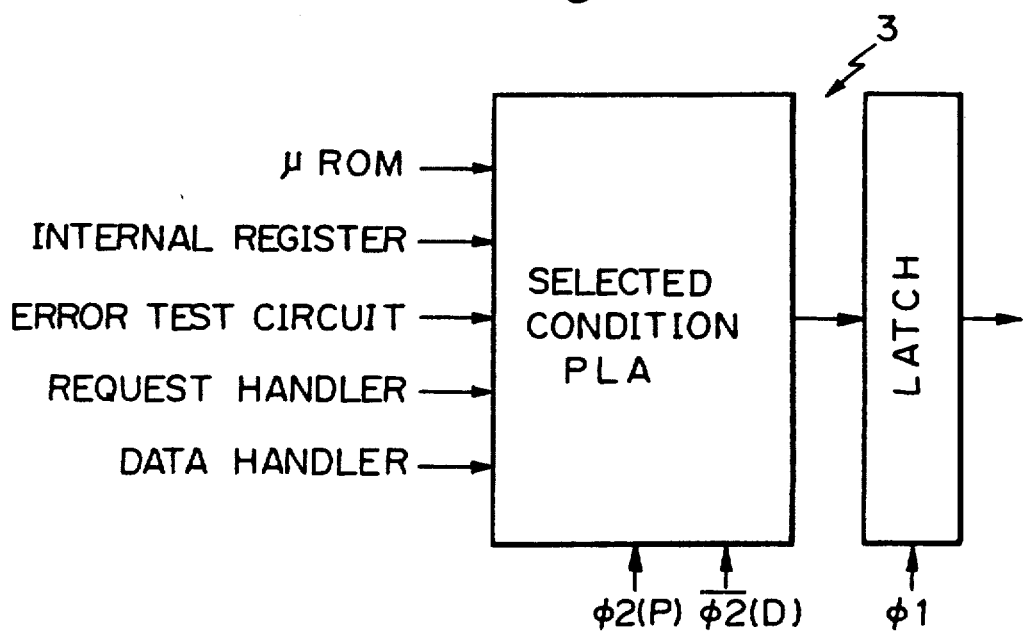
FIG. 16 is a schematic structural view of the selected condition PLA shown in FIG. 15.

FIG. 16 is a schematic structural view of the selected condition PLA 3 shown in FIG. 15. The selected conditions are determined by various signals input from the above-mentioned $\mu$ROM, the internal registers of the DMA controller, error test circuit, the request handler R, the data handler D, etc. and are taken into the latch circuit by the clock signal $\phi$1. Note that, for example, the above-mentioned operation processing request signal OREQ is input from the request handler R and the bus error signal BERR is input from the data handler D.

Figure 17:
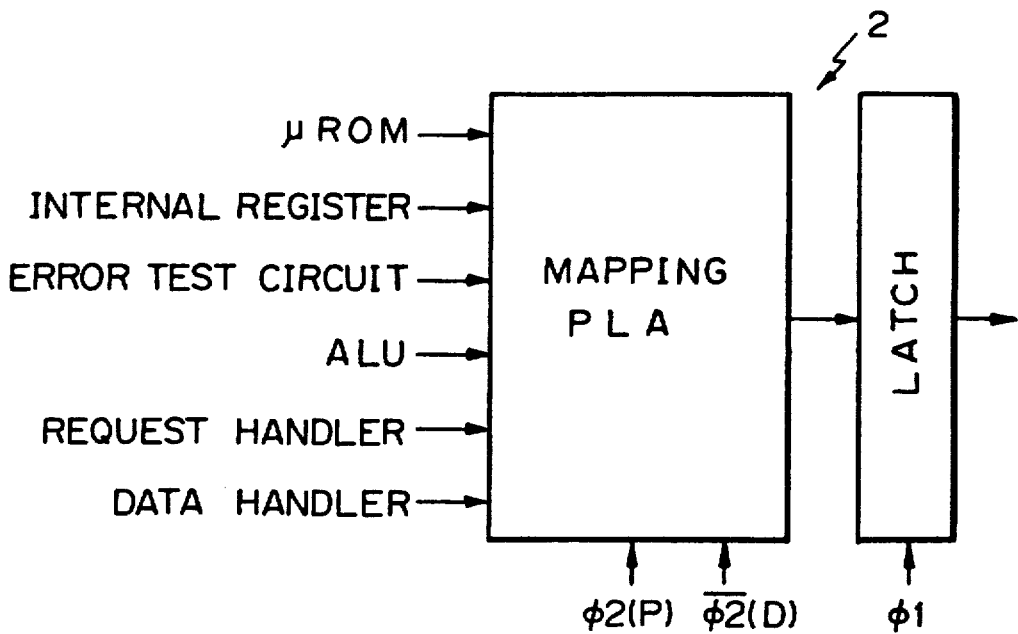
FIG. 17 is a schematic structural view of the mapping PLA shown in FIG. 15.

FIG. 17 is a schematic structural view of the mapping PLA 2 shown in FIG. 15. The microaddress information from which the μROM must operate is determined by various signal conditions input from the above-mentioned μROM, internal registers of the DMA controller, error test circuit, ALU, request handler R, data handler D, and the like and is taken into the latch circuit by the clock signal $\phi1$. Note that, for example, the above-mentioned read instruction CODE is input from the μROM, the operation processing request signal OREQ is input from the request handler R, and the bus error signal BERR is input from the data handler D.

Therefore, according to the present invention, by using the operational microaddress register provided to eliminate the problems accompanying bus error processing, it is possible to write in advance microaddress information as initial value from the mapping PLA to data transfer microaddress registers during the operation of the operational microaddress register, and thus enable high speed start processing of data transfer, when receiving a data transfer processing request, without a dead cycle.

While the invention has been particularly shown and described in reference to preferred embodiments thereof, it will be understood by those skilled in the art that changes in form and details may be made therein without departing from the spirit and scope of the invention.

We claim:

1. A data transfer controlling apparatus for direct memory access comprising:
   at least one first microaddress register, each register storing first microaddress information, said first microaddress information being for program processing of data transfer for a corresponding channel;
   a second microaddress register which stores second microaddress information, said second microaddress information being for operational program processing other than said program processing of said data transfer;
   a micro read only memory operatively connected to said first and second microaddress registers, for storing microinstructions and outputting a predetermined microinstruction in accordance with said first and second microaddress information respectively read out from a selected one of said first microaddress registers and said second microaddress register; and
   an incremental element operatively connected to said first and second microaddress registers, for incrementing the value of said first and second microaddress information respectively read out from the selected one of said first microaddress registers and said second microaddress register, and for respectively writing said incremented first and second microaddress information to said selected one of said first microaddress registers and said second microaddress register, said first microaddress information stored in one of said first microaddress registers for said corresponding channel being read out when said program processing of said data transfer for said corresponding channel is carried out, said second microaddress information stored in said second microaddress register being read out when operational program processing other than said program processing of said data transfer is carried out.

2. A data transfer controlling apparatus according to claim 1, further comprising a microaddress register control unit, said control unit supplying a read signal and write signal for said microaddress information to one of said first microaddress registers for said corresponding channel when said program processing of the data transfer for said corresponding channel is carried out, said control unit supplying a read signal and write signal for said microaddress information to said second microaddress register when program processing other than said program processing of the data transfer is carried out.

3. A data transfer controlling apparatus according to claim 2, wherein said control unit comprises means for receiving a bus error signal and supplies said read signal and said write signal for said microaddress information to said second microaddress register when program processing for bus error processing is carried out.

4. A data transfer controlling apparatus according to claim 2, wherein said control unit comprises means for receiving a channel indication signal and a transfer request signal for said program processing of the data transfer and receives said transfer request signal for a channel newly indicated by said channel indication signal before said program processing of data transfer for another channel previously indicated by said channel indication signal is completed.

5. A data transfer controlling apparatus according to claim 1, further comprising a mapping programmable logic array, the microaddress information read out from said mapping programmable logic array being written to said first microaddress registers while program processing based on the microaddress information read out from said second microaddress register is carried out.

6. A data transfer controlling apparatus according to claim 5, wherein said microaddress information read out from said mapping programmable logic array is written to said first microaddress registers in accordance with a write instruction supplied from said micro read only memory.

7. A data transfer controlling apparatus according to claim 5, wherein said microaddress information read out from said mapping programmable logic array is initial microaddress information to be stored in said first microaddress registers.

8. A data transfer controlling apparatus according to claim 5, wherein said microaddress information read out from said mapping programmable logic array is written to said first microaddress registers at start processing which is carried out before said program processing of the data transfer is carried out.

* * * * *